United States Patent
Kim

(10) Patent No.: US 9,654,043 B2
(45) Date of Patent: May 16, 2017

(54) APPARATUS AND METHOD FOR CONTROLLING TEMPERATURE CHANGE IN MOTOR

(71) Applicant: HYUNDAI MOBIS CO., LTD., Seoul (KR)

(72) Inventor: Sang-Min Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/681,960

(22) Filed: Apr. 8, 2015

(65) Prior Publication Data

US 2015/0372627 A1 Dec. 24, 2015

(30) Foreign Application Priority Data

Jun. 19, 2014 (KR) .................. 10-2014-0074819

(51) Int. Cl.
| | |
|---|---|
| H02P 21/14 | (2016.01) |
| H02P 21/16 | (2016.01) |
| H02P 29/64 | (2016.01) |

(52) U.S. Cl.
CPC ............ *H02P 21/141* (2013.01); *H02P 21/16* (2016.02); *H02P 29/64* (2016.02)

(58) Field of Classification Search
CPC ....... H02P 21/14; H02P 21/16; H02P 29/0055
See application file for complete search history.

(56) References Cited

U.S. PATENT DOCUMENTS

| | | | | |
|---|---|---|---|---|
| 2007/0236167 A1* | 10/2007 | Tomigashi | ................ | H02P 6/18 318/721 |
| 2009/0026988 A1* | 1/2009 | Tomigashi | .............. | H02P 21/10 318/400.02 |
| 2009/0160394 A1* | 6/2009 | Zhang | ..................... | H02P 21/14 318/799 |
| 2009/0284204 A1* | 11/2009 | Colby | .................. | H02P 21/145 318/490 |
| 2012/0007532 A1* | 1/2012 | Baglino | ................ | B60L 15/025 318/473 |
| 2014/0132200 A1* | 5/2014 | Yoo | ......................... | H02P 21/14 318/798 |

FOREIGN PATENT DOCUMENTS

| | | |
|---|---|---|
| KR | 10-0951975 B1 | 4/2010 |
| KR | 10-1251533 B1 | 4/2013 |

\* cited by examiner

*Primary Examiner* — Shawki S Ismail
*Assistant Examiner* — Muhammad S Islam
(74) *Attorney, Agent, or Firm* — Knobbe Martens Olson & Bear LLP

(57) ABSTRACT

An apparatus for controlling a temperature change in a motor may include a rotor resistance estimator calculating a rotor resistance estimation value of the motor utilizing a DQ-axis voltage command value and a coordinate conversion DQ-axis current value, a synchronous angle estimator estimating a synchronous angle utilizing the rotor resistance estimation value, a rotor angular velocity of the motor and a DQ-axis current command value, a coordinate converter creating the coordinate conversion DQ-axis current value utilizing the synchronous angle and a sensing current value, a current controller creating the DQ-axis voltage command value utilizing the DQ-axis current command value and the coordinate conversion DQ-axis current value, and a power conversion unit converting the power according to the DQ-axis voltage command value and supplying the converted power to the motor.

12 Claims, 9 Drawing Sheets

APPARATUS AND METHOD FOR CONTROLLING TEMPERATURE CHANGE IN MOTOR

CROSS-REFERENCE(S) TO RELATED APPLICATION(S)

This application claims the benefit of priority to Korean Patent Application No. 10-2014-0074819 filed on Jun. 19, 2014, the entire contents of which are incorporated herein by reference.

BACKGROUND

Field

The present disclosure relates to a three-phase (3-p) motor, and more specifically, to an apparatus and method for controlling a temperature change in a motor.

Description of Related Art

In general, to cope with air pollution and an oil depletion crisis, the technologies related to environmentally friendly vehicles utilizing an electric energy as a power of vehicle have been developed.

A hybrid electric vehicle, a plug-in electric vehicle, a fuel cell electric vehicle and an electric vehicle may be examples of the above environmentally friendly vehicles.

A permanent magnet type electric motor has been widely employed for the above environmentally friendly vehicle. The permanent magnet type electric motor utilizes a permanent magnet to generate a driving force. An intensity of magnetization of the permanent magnet can be permanently changed according to an operating environment of the permanent magnet, in particular, a magnitude of a weak field current and an operational temperature of the electric motor.

In this situation, the electric motor cannot generate a desired driving force. Due to the above, in the electric motor employing the electric motor, an accelerating ability and a fuel economy effect are rapidly deteriorated.

Korean Patent No. 10-1251533 discloses an apparatus for controlling induction motor and a method for controlling induction motor.

SUMMARY

One aspect of the present invention provides an apparatus and a method for controlling a temperature change in a motor, which can estimate a rotor resistance of an induction motor in real time.

In addition, another aspect of the present invention provides an apparatus and method for controlling a temperature change in a motor, which estimate a rotor resistance utilizing a magnetic flux calculation error of a magnetic flux current model and a voltage model of a rotor.

A further aspect of the present invention provides an apparatus and a method for controlling a temperature change in a motor, which can estimate a rotor resistance of an induction motor in real time.

An apparatus for controlling a temperature change in a motor according to embodiments of the present invention includes a rotor resistance estimator calculating a rotor resistance estimation value of the motor utilizing a DQ-axis voltage command value and a coordinate conversion DQ-axis current value; a synchronous angle estimator estimating a synchronous angle utilizing the rotor resistance estimation value, a rotor angular velocity of the motor and the DQ-axis current command value; a coordinate converter creating the coordinate conversion DQ-axis current value utilizing the synchronous angle and a sensing current value; a current controller creating the DQ-axis voltage command value utilizing the DQ-axis current command value and the coordinate conversion DQ-axis current value; and a power conversion unit converting the power according to the DQ-axis voltage command value and supplying the converted power to the motor.

At this time, the rotor resistance estimator may calculate the rotor resistance estimation value utilizing errors of a first rotor magnetic flux estimator, which uses a voltage model, and a second rotor magnetic flux estimator, which uses a current model.

Also, the rotor resistance estimator may use the voltage model as a reference model and sets the current model as an adaptive model.

In addition, the first rotor magnetic flux estimator may does not have a rotor resistance value and the second rotor magnetic flux estimator may have a rotor resistance value.

Also, the rotor resistance value may be changed according to a rotor temperature and may be changed more slowly than a magnetic flux and a current value.

In addition, the rotor resistance estimation value may be calculated by using a magnetic flux estimation value of the voltage model and a magnetic flux estimation value of the current model.

At this time, the magnetic flux estimation value of the voltage model may be the value in a normal status and the magnetic flux estimation value of the current model may be the value in real time.

Also, the coordinate converter may use a synchronous frame.

In addition, the synchronous angle estimator may set a proportional integral (PI) control gain using a phase locked loop (PPL) scheme so that each estimation error becomes zero (0).

At this time, the synchronous angle estimator may calculate a location of a DQ magnetic flux of the rotor using the current model, a magnitude of each estimated error may be similar to a ratio of the DQ magnetic flux of the rotor, and the ratio of the DQ magnetic flux of the rotor may be maintained at the value which is less than 0.1.

Also, the power conversion unit may convert the DQ-axis voltage command value into an input current of the motor using a pulse width modulation (PWM) method.

In addition, the DQ-axis current command value may be calculated by using a Q-axis current map and a D-axis current map in which the values corresponding to a torque command value and a synchronous angular velocity value are set, respectively, in advance.

Furthermore, the rotor resistance estimator may compare a torque command change value and a synchronous angular velocity change value with a preset specific value which is predetermined in advance, the rotor resistance estimator may turn-on a rotor resistance estimation function if the above change values are less than the specific value and may turn-off the rotor resistance estimation function if the above change values are greater than the specific value.

In meanwhile, one embodiment of the present invention provides a method for controlling a temperature change in a motor comprising of a rotor resistance estimation step for calculating a rotor resistance estimation value of the motor utilizing a DQ-axis voltage command value and a coordinate conversion DQ-axis current value; a synchronous angle estimation step for estimating a synchronous angle utilizing the rotor resistance estimation value, a rotor angular velocity of the motor and a DQ-axis current command value; a coordinate conversion step for creating the coordinate conversion DQ-axis current value utilizing the synchronous angle and a sensing current value; a voltage command value creating step for creating the DQ-axis voltage command value utilizing the DQ-axis current command value and the coordinate conversion DQ-axis current value; and a power conversion step for converting the power according to the DQ-axis voltage command value and supplying the converted power to the motor.

In the rotor resistance estimation step, at this time, the rotor resistance estimation value may be calculated by utilizing an error of a first rotor magnetic flux estimator, which uses a voltage model, and a second rotor magnetic flux estimator, which uses a current model.

In the rotor resistance estimation step, in addition, the voltage model may be used as a reference model and the current model may be set as an adaptive model.

In addition, the rotor resistance estimation step comprises the steps of comparing a torque command change value and a synchronous angular velocity change value with a specific value which is predetermined in advance, turning-on a rotor resistance estimation function if the above change values are less than the specific value as the comparison result; and turning-off the rotor resistance estimation function if the above change values are greater than the specific value as the comparison result.

One embodiment of the invention provides controlling temperature changes of an electric motor for used in an electric vehicle based on estimation of resistance value of a rotor while operating the motor. An apparatus for controlling the temperature change of a motor, which comprises; a rotor resistance estimating module configured to estimate a rotor resistance estimation value of the motor utilizing a DQ-axis voltage command value and a coordinate conversion DQ-axis current value; a synchronous angle estimating module configured to estimate a synchronous angle utilizing the rotor resistance estimation value, an angular velocity of the rotor and a DQ-axis current command value; a coordinate converter module configure to create the coordinate conversion of a DQ-axis current value utilizing the synchronous angle and a detected current value of a stator of the motor; a current controller configured to create the DQ-axis voltage command value utilizing the DQ-axis current command value and the coordinate-converted DQ-axis current value; and a power supplier configured to supply electric power to the motor based on the DQ-axis voltage command value.

DESCRIPTION OF EMBODIMENTS

Figure 1:
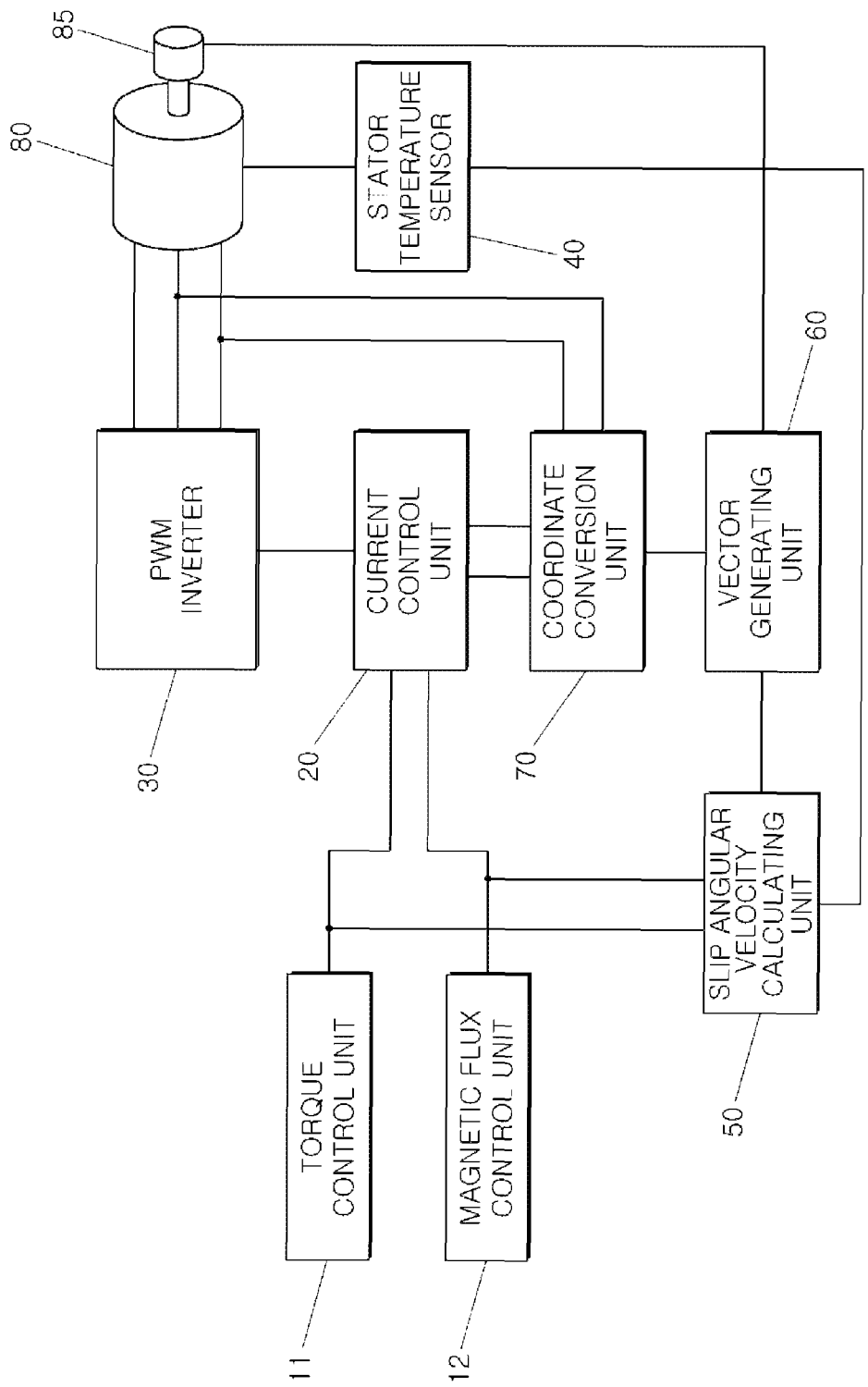
FIG. 1 is a block diagram of a control device of an induction motor.

Embodiments are illustrated in the drawings and are described in detail in the present specification. However, it should be understood that the present invention are not limited to specific disclosed embodiments, but include all modifications, equivalents and substitutes encompassed within the spirit and technical scope of the present invention.

In the drawings, the similar structural components are indicated by the similar reference numerals.

The terms including the ordinal numeral such as "first", "second", etc. may be used to describe various components, but the components are not limited by such terms. The terms are used only for the purpose of distinguishing one component from other components.

For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

Unless otherwise specified, all of the terms which are used herein, including the technical or scientific terms, have the same meanings as those that are generally understood by a person having ordinary knowledge in the art to which the present invention pertains.

The terms defined in a generally used dictionary must be understood to have meanings identical to those used in the context of a related art, and are not to be construed to have ideal or excessively formal meanings unless they are obviously specified in the present specification.

Hereinafter, an apparatus and a method for controlling a temperature change in a motor according to one embodiment of the present invention are illustrated with reference to the accompanying drawings.

FIG. 1 shows a system for indirectly calculating a rotor resistance according to a temperature of a stator of a motor.

Referring to FIG. 1, an apparatus for controlling an induction motor includes a stator temperature sensor 40 measuring a temperature of a stator of the induction motor 80; a slip angular velocity calculating unit 50 for estimating a rotor resistance according to a relation between the temperature of the stator and the rotor resistance, compensating a rotor time constant with the rotor resistance and calculating a slip angular velocity utilizing the compensated rotor time constant; a vector generating unit 60 for calculating a slip frequency utilizing a rotor angular velocity measured by an encoder 85 connected to the rotor of the motor 80 and the slip angular velocity; and a coordinate conversion unit 70 for generating a q-axis command current and a d-axis command current according to the slip frequency.

However, the above method may be disadvantageous in that the rotor resistance is indirectly calculated by using the stator temperature. More concretely, the rotor temperature may differ from the stator temperature by up to approximately 100° C. A resistance change of the rotor may cause a change of a slip, and the change of slip may cause the torque control error.

Figure 2:
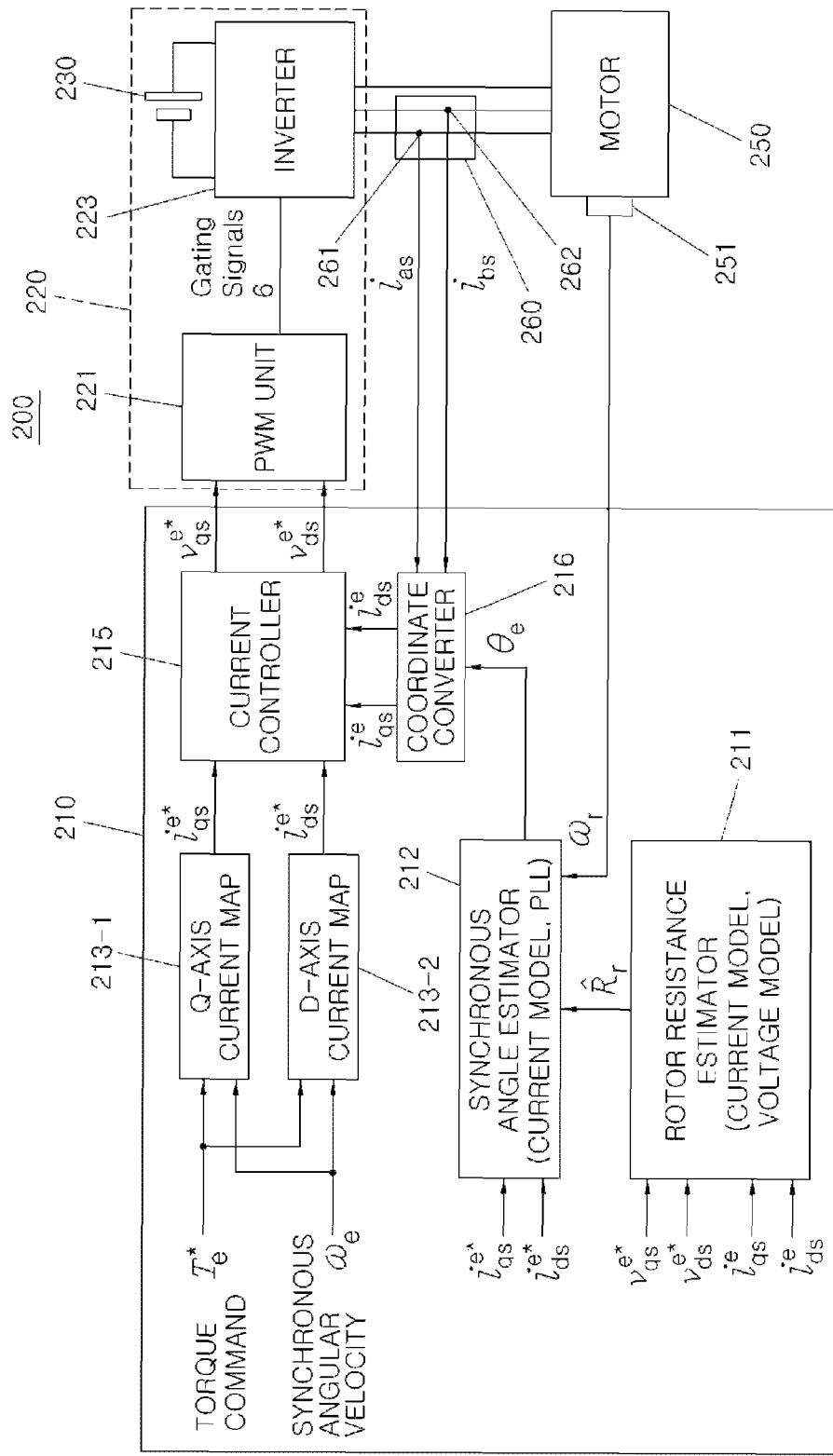
FIG. 2 is a block diagram of an apparatus for controlling a temperature change in a motor according to one embodiment of the present invention.

FIG. 2 is a block diagram of an apparatus 200 for controlling a temperature change in a motor according to one embodiment of the present invention. Referring to FIG. 2, the apparatus 200 for controlling a temperature change in a motor includes a motor control unit 210, a power conversion unit 220, a battery 230 and a motor 250.

The motor control unit 210 includes a Q-axis current map 213-1 converted into a Q-axis current command value $i_{qs}^{e*}$ according to an input of a torque command value $T_e^*$ and/or a synchronous angular velocity $\omega_e$; a D-axis current map 213-2 converted into a D-axis current command value $i_{ds}^{e*}$; a rotor resistance estimator 211 calculating a rotor resistance estimation value $\hat{R}_r$ of the motor 250 utilizing DQ-axis voltage command values $v_{qs}^{e*}$, $v_{ds}^{e*}$ and coordinate conversion DQ-axis current values $i_{qs}^{e}$, $i_{ds}^{e}$; a synchronous angle estimator 212 estimating a synchronous angle $\theta_e$ utilizing the rotor resistance estimation value $\hat{R}_r$, a rotor angular velocity $\omega_r$ of the motor 250 and DQ-axis current command values $i_{qs}^{e}$, $i_{ds}^{e}$; a coordinate converter 216 creating the coordinate conversion DQ-axis current value utilizing the synchronous angle $\theta_e$ and sensing current values $i_{as}$, $i_{bs}$; and a current controller 215 creating the DQ-axis voltage command values $v_{qs}^{e*}$, $v_{ds}^{e*}$ utilizing the DQ-axis current command values $i_{qs}^{e}$, $i_{ds}^{e}$ and the coordinate conversion DQ-axis current values $i_{qs}^{e}$, $i_{ds}^{e}$.

In addition, the power conversion unit 220 converts an output power of the battery 230 according to the DQ-axis voltage command value which is determined in and applied through the current controller 215 and supplies it to the motor 250. To attain this end, the power conversion unit 220 includes a pulse width modulation (PWM) part 221 and an inverter 223.

The PWM part 221 converts the DQ-axis voltage command value into a PWM signal (gating signal) using a PWM method, and controls the inverter 223 with such PWM signal.

As the inverter 223, a PWM (pulse width modulation) inverter which is a voltage source inverter is utilized. However, the present invention is not limited thereto, and a current source inverter can be employed if some of structural components are modified.

In the PWM inverter, the direct rectified voltage is controlled with a voltage and a frequency through PWM method.

Therefore, the inverter 223 consists of a plurality of power switching devices. An insulated gate transistor is mainly employed as the power switching device. However, the present invention is not limited thereto, and a bipolar device, a power MOSFET (metal oxide silicon field effect transistor) device may be employed as the power switching device. The power MOSFET device is actuated with a high voltage and a high current, and, unlike an ordinary MOSFET device, has a DMOS (double-diffused metal oxide semiconductor) structure.

The battery 230 consists of battery cells which are connected to each other in parallel and/or in series. A nickel metal battery, a lithium ion battery may be utilized as a high voltage battery for the electric vehicle. In general, the high voltage battery means a battery utilizing as a power source by which the electric vehicle is driven, and outputting a high voltage of 100 V or more. However, the battery of the present invention is not limited thereto, a low voltage battery may be used as the battery 230.

Here, an electric vehicle, a hybrid electric vehicle, a plug-in electric vehicle, a fuel cell electric vehicle and the like may be examples of the electric vehicle.

The motor 250 is a 3-phase alternating current (AC) induction motor and consists of a stator around which a coil is wound and a rotor. For an understanding of the present invention, the 3-phase AC inductor motor is illustrated in the one embodiment of the present invention. However, the present invention is not limited thereto and may be applied to a single-phase motor through a modification and/or change.

In addition, an interior permanent magnet motor may be employed as the motor 250. However, the present invention is not limited thereto, and a universal motor can be used as the motor.

A current sensor 260 is provided on the stator of the above motor for sensing a stator current of the motor and providing 3-phase current values $i_{as}$, $i_{bs}$ and $i_{cs}$ to the current controller 215. This current sensor 260 acts as the stator current sensor of the motor. Of course, the current sensor 260 may consist of a first stator current sensor 261 and a second stator current sensor 262.

The 3-phase current values $i_{as}$, $i_{bs}$ and $i_{cs}$ are converted into the coordinate conversion DQ-axis current values $i_{qs}^{e}$, $i_{ds}^{e}$ by means of the coordinate converter 216 and is then provided to the current controller 215. Here, the coordinate converter 216 employs a synchronous frame.

In addition, the DQ-axis current command values corresponding to the torque command value and/or the synchronous angular velocity value are mapped in advance and set in the Q-axis current map 213-1 and the D-axis current map 213-2. Therefore, once the torque command value and/or the synchronous angular velocity value are input, the DQ-axis current command values mapped to the torque command value and/or the synchronous angular velocity value are calculated.

Figure 3:
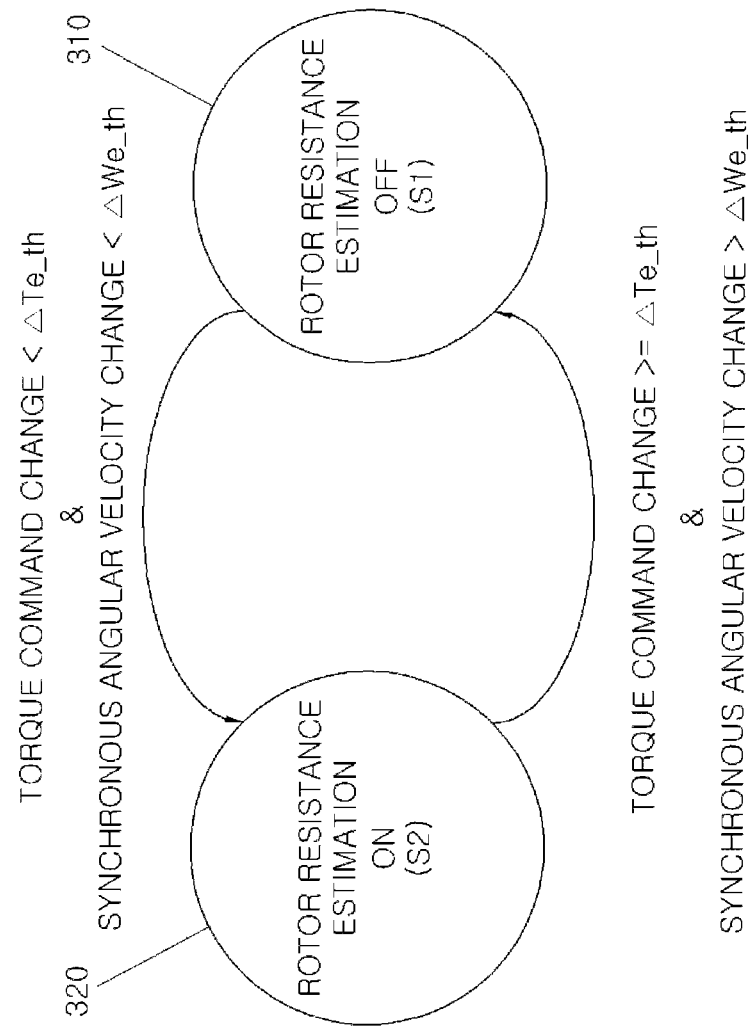
FIG. 3 is a view showing an operation state of a rotor resistance estimation function according to one embodiment of the present invention.

FIG. 3 is a view showing an operation state of a rotor resistance estimation function according to one embodiment of the present invention. Referring to FIG. 3, rotor resistance estimation OFF (310) indicates that the rotor resistance estimation function is in an OFF status.

More concretely, if a torque command changing value is greater than a limit value ΔTe_th and a synchronous angular velocity changing value is greater than a limit value ΔWe_th, the rotor resistance estimation is not performed. Here, the limit values ΔTe_th are ΔWe_th become the reference value which is predetermined in advance.

Rotor resistance estimation ON (320) in FIG. 3 indicates that the rotor resistance estimation function is in an ON status.

More concretely, if the torque command change value is less than the limit value ΔTe_th and the synchronous angular velocity change value is less than the limit value ΔWe_th, the rotor resistance estimation is performed.

Figure 4:
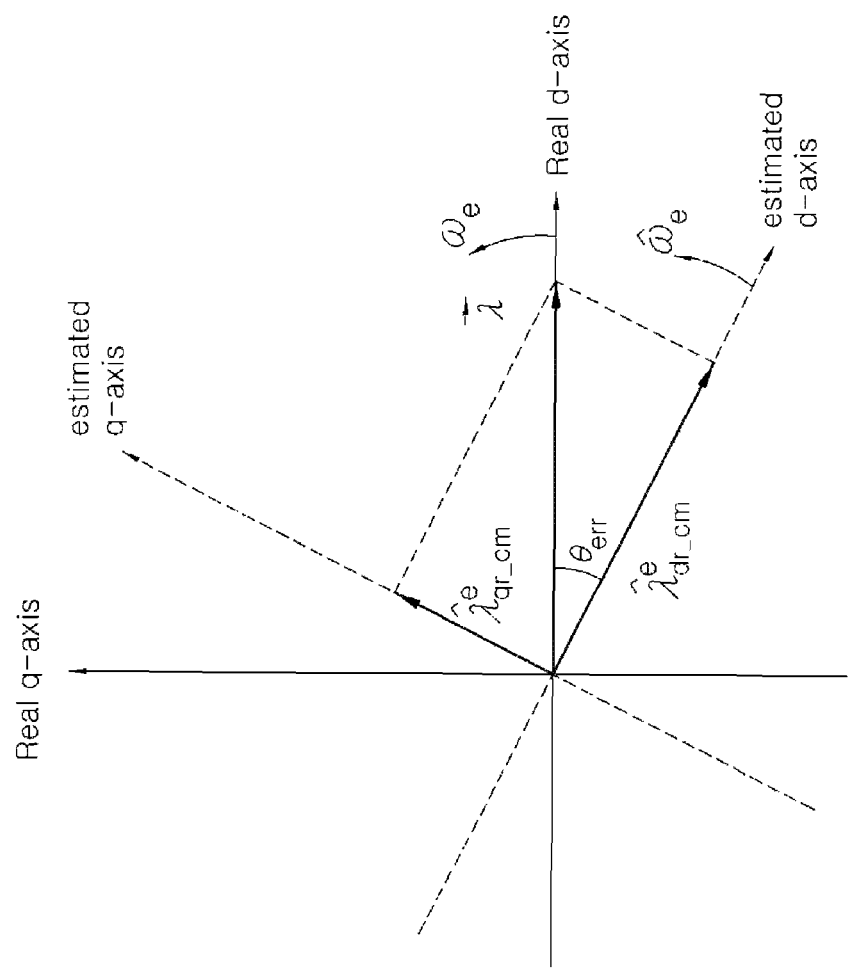
FIG. 4 is a graph showing an example of a magnetic flux estimation principle.
Figure 5:
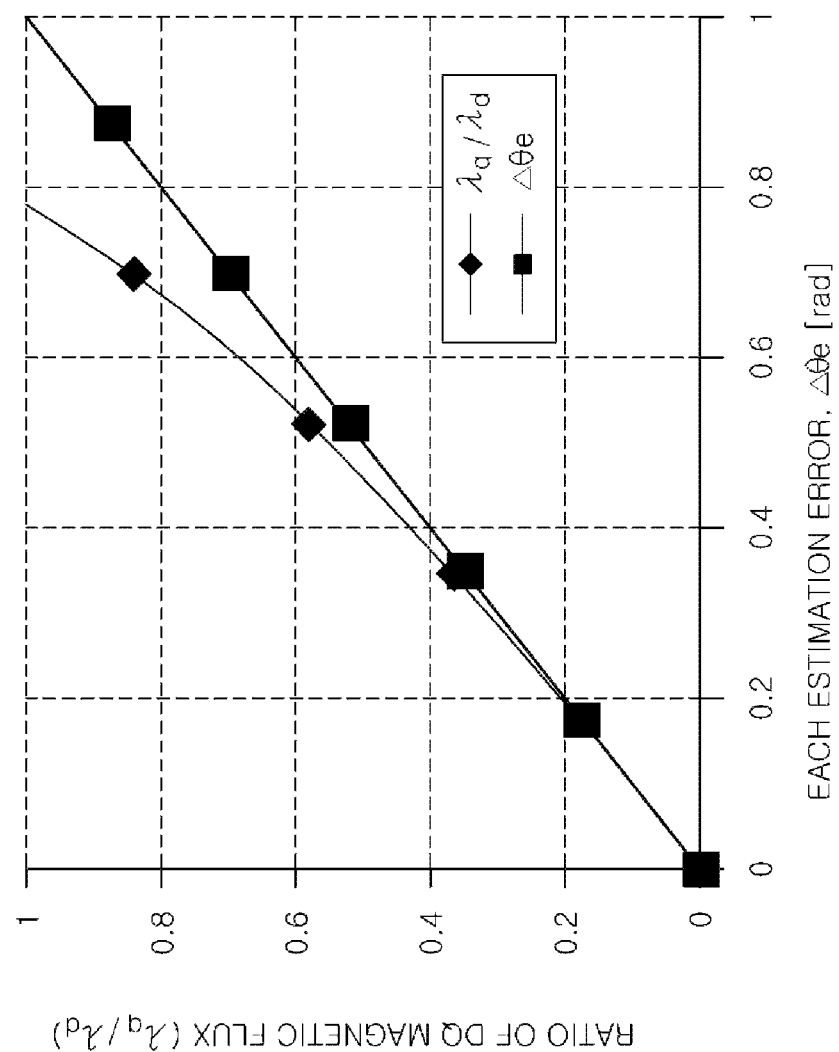
FIG. 5 is a graph showing each estimation error according to a DQ magnetic flux ratio shown in FIG. 4.

FIG. 4 is a graph showing a magnetic flux estimation principle, and FIG. 5 is a graph showing each estimation error according to a DQ magnetic flux ratio shown in FIG. 4.

The synchronous angle estimator 212 (see FIG. 2) estimates the synchronous angle $\theta_e$ utilizing the principle of the graphs shown in FIG. 4 and FIG. 5. For estimating this synchronous angle $\theta_e$, a PI (proportional/integral) control gain is set by means of a PLL (phase locked loop) method so that each estimation error $\Delta\theta_e$ becomes zero (0).

The PI control gain is predetermined to satisfy a second-order response characteristics as the below equation.

$$\left(\Delta\theta\left(K_{p\_pll} + \frac{K_{i\_pll}}{s} + \omega_r\right)\right)\frac{1}{s} = \quad \text{Equation 1}$$

$$\left((\theta_e - \hat{\theta})\left(K_{p\_pll} + \frac{K_{i\_pll}}{s} + \omega_r\right)\right)\frac{1}{s} = \hat{\theta}_e$$

$$\frac{\hat{\theta}_e}{\theta_e} = \frac{K_{p\_pll}s + K_{i\_pll}}{s^2 + K_{p\_pll}s + K_{i\_pll}} \quad \text{Equation 2}$$

Here, $K_{p\_pll} = \sqrt{2}\,\omega_{c\_pll}$, $K_{i\_pll} = \omega_{c\_pll}^2$.

At this time, when the error value is small, a magnitude of each estimation error $\Delta\theta_e$ is similar to a ratio ($\lambda q/\lambda d$) of the DQ magnetic flux of the rotor. Also, since the rotor is controlled so that the Q axis magnetic flux thereof becomes zero (0), the ratio of the DQ magnetic flux of the rotor is maintained at the value which is less than approximately 0.1.

Therefore, the ratio of the DQ magnetic flux of the rotor is used as a substitution variable of each estimation error $\Delta\theta_e$. This is advantageous in that a convergence rate quicken. Each estimation error $\Delta\theta_e$ may be expressed by an equation as below.

$$\Delta\theta_e = \theta_e - \hat{\theta}_e \cong \tan(\theta_e - \hat{\theta}_e) = \frac{\hat{\lambda}^e_{qr\_cm}}{\hat{\lambda}^e_{dr\_cm}} \quad \text{Equation 3}$$

Figure 6:
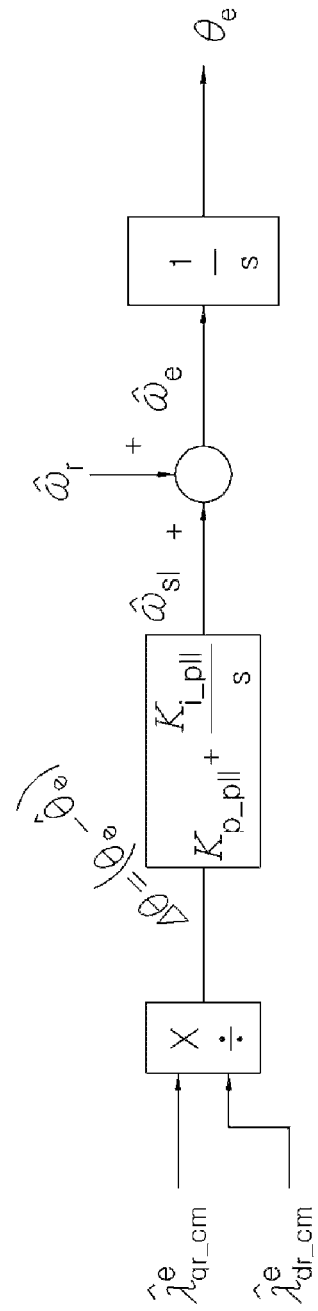
FIG. 6 is a block diagram illustrating a concept for calculating each estimation error according to one embodiment of the present invention.

The above-mentioned equations are easily understood by FIG. 6. In other words, FIG. 6 is a block diagram illustrating a concept for calculating each estimation error according to one embodiment of the present invention. Here, $\hat{\omega}_s$ indicates the slip angular velocity, $\hat{\omega}_r$ indicates the rotor angular velocity, and $\hat{\omega}_e$ indicates the synchronous angular velocity.

At this time, the rotor RQ magnetic flux is calculated by means of the rotor magnetic estimator which utilizes the current mode. Detail thereon will be described later.

To conclude, one the rotor Q-axis magnetic flux is converged to 0 (zero), the synchronous estimation value is converged to a real value.

Figure 7:
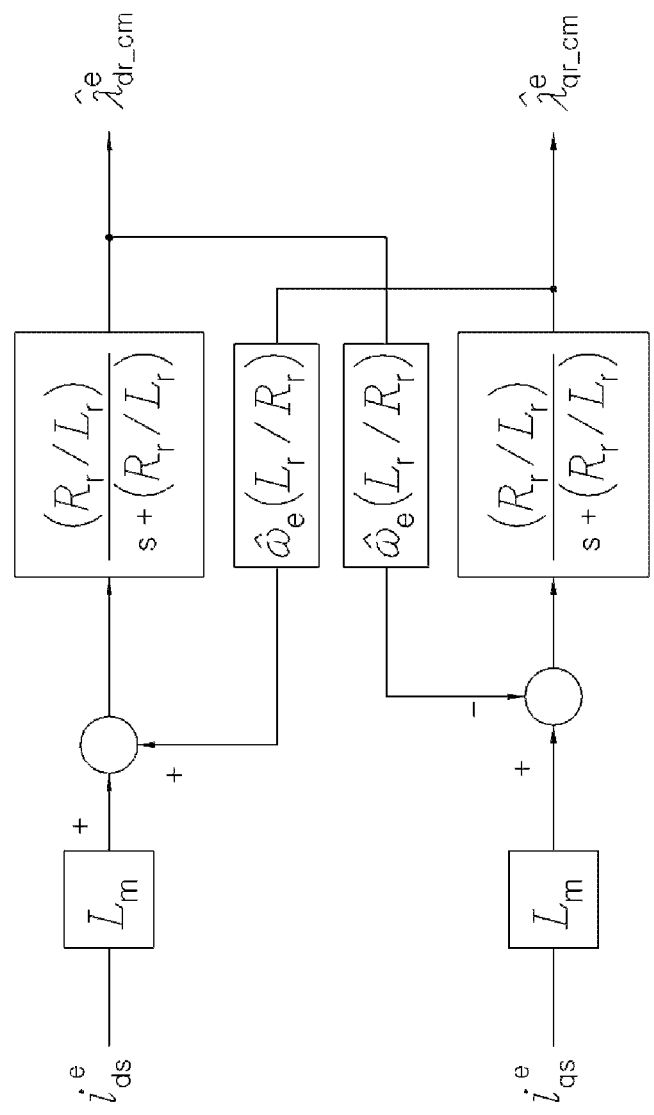
FIG. 7 is a block diagram showing a concept for calculating a rotor magnetic flux utilizing a current model according to one embodiment of the present invention.

FIG. 7 is a block diagram showing a concept for calculating the rotor magnetic flux utilizing a current model according to one embodiment of the present invention. This is expressed by the equation as below.

$$\frac{d}{dt}\hat{\lambda}^e_{dr\_cm} = R_r\frac{L_m}{L_r}i^e_{ds} - \frac{R_r}{L_r}\hat{\lambda}^e_{dr\_cm} + \omega_{sl}\hat{\lambda}^e_{qr\_cm} \quad \text{Equation 4}$$

$$\frac{d}{dt}\hat{\lambda}^e_{qr\_cm} = R_r\frac{L_m}{L_r}i^e_{qs} - \frac{R_r}{L_r}\hat{\lambda}^e_{qr\_cm} + \omega_{sl}\hat{\lambda}^e_{dr\_cm}$$

Here, Rr indicates the rotor resistance, Lr indicates the rotor self-inductance and Lm indicates the magnetizing inductance.

Figure 8:
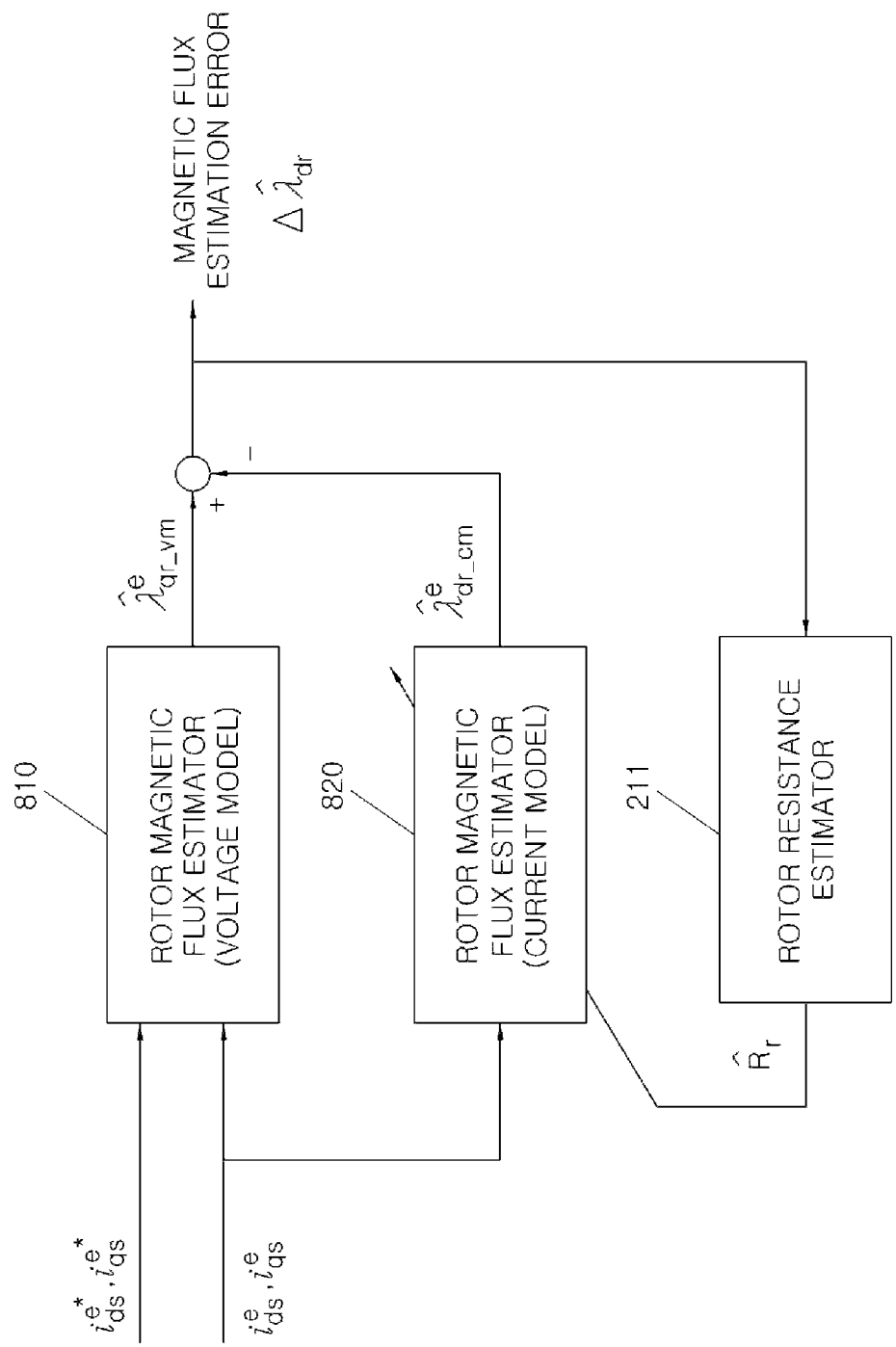
FIG. 8 is a conceptual view showing an operation of a rotor resistance estimator utilizing a voltage model and/or a current model according to one embodiment of the present invention.

FIG. 8 is a conceptual view showing an operation of the rotor resistance estimator 211 (see FIG. 2) utilizing the voltage model and/or the current model according to one embodiment of the present invention. Referring to FIG. 8, the rotor resistance estimator 211 calculates the rotor resistance estimation value $\hat{R}_r$ utilizing an error of a first rotor magnetic flux estimator 810, which uses the voltage model, and a second rotor magnetic flux estimator 810, which uses the current model.

The first rotor magnetic flux estimator 810 uses the voltage model and is expressed by the expression as below.

$$v^{e*}_{ds} = \quad \text{Equation 5}$$
$$R_s i^e_{ds} + \sigma L_s \frac{d}{dt}i^e_{ds} + \frac{L_m}{L_r}\frac{d}{dt}\hat{\lambda}^e_{dr\_vm} - \omega_e\left(\sigma L_s i^e_{qs} + \frac{L_m}{L_r}\hat{\lambda}^e_{qr\_vm}\right)$$

$$v^{e*}_{qs} = R_s i^e_{qs} + \sigma L_s \frac{d}{dt}i^e_{qs} + \frac{L_m}{L_r}\frac{d}{dt}\hat{\lambda}^e_{qr\_vm} +$$
$$\omega_e\left(\sigma L_s i^e_{ds} + \frac{L_m}{L_r}\hat{\lambda}^e_{dr\_vm}\right)$$

Here, Rs indicates the stator resistance, Lm indicates the magnetizing inductance, Lr indicates the rotor self-inductance, Ls indicates the stator self-inductance, and σ: 1−(Lm*Lm)/(Lr*Ls) is indicated.

If the derivative term is ignored (that is, removed), the above equation may be briefly expressed by the equation as below.

$$\hat{\lambda}^e_{dr\_vm} = \frac{L_r}{L_m}\left(\frac{v^{e*}_{qs} - r_s i^e_{qs}}{\omega_e} - \sigma L_s i^e_{ds}\right) \quad \text{Equation 6}$$

$$\hat{\lambda}^e_{qr\_vm} = \frac{L_r}{L_m}\left(\frac{v^{e*}_{ds} - r_s i^e_{ds}}{\omega_e} - \sigma L_s i^e_{qs}\right)$$

Referring to FIG. 8 again, the rotor resistance estimator 211 uses the voltage model as a reference model and sets the current model as an adaptive model in the synchronous frame.

Here, the rotor resistance estimation value $\hat{R}_r$ is expressed by an equation as below.

$$\hat{R}_r = \left(K_{p\_RrEst} + \frac{K_{i\_RrEst}}{s}\right)\Delta\lambda_{dr} \quad \text{Equation 7}$$

Since the first rotor magnetic flux estimator 810 using the voltage model does not have a rotor resistance value Rr and the second rotor magnetic flux estimator 820 using the current model has the rotor resistance value Rr, the rotor resistance value Rr can be estimated by using a magnetic flux estimation value difference the voltage model and the current model.

In addition, since internal variables are intricately entangled by the derivative terms, the rotor magnetic flux estimation value may be sensitive to an initial value of an integrator.

And, if the current/the magnetic flux are slowly changed enough to neglect the change amount thereof, the derivative terms can be neglected and this state can be regarded as a normal state to calculate more accurately the rotor magnetic flux.

The rotor resistance value is the value which is changed according to the rotor temperature, and is extremely slowly changed in comparison with the magnetic flux/current. On the basis of the above characteristic, it is possible to estimate the rotor resistance using the magnetic flux estimation value of the (normal state) voltage model and the magnetic flux estimation value of the (real time) current model under the state in which the current/magnetic flux are slowly changed.

In particular, since the rotor magnetic flux estimation value estimated by the current model is calculated in real for estimating the synchronous angle, it is possible to utilize this value.

Figure 9:
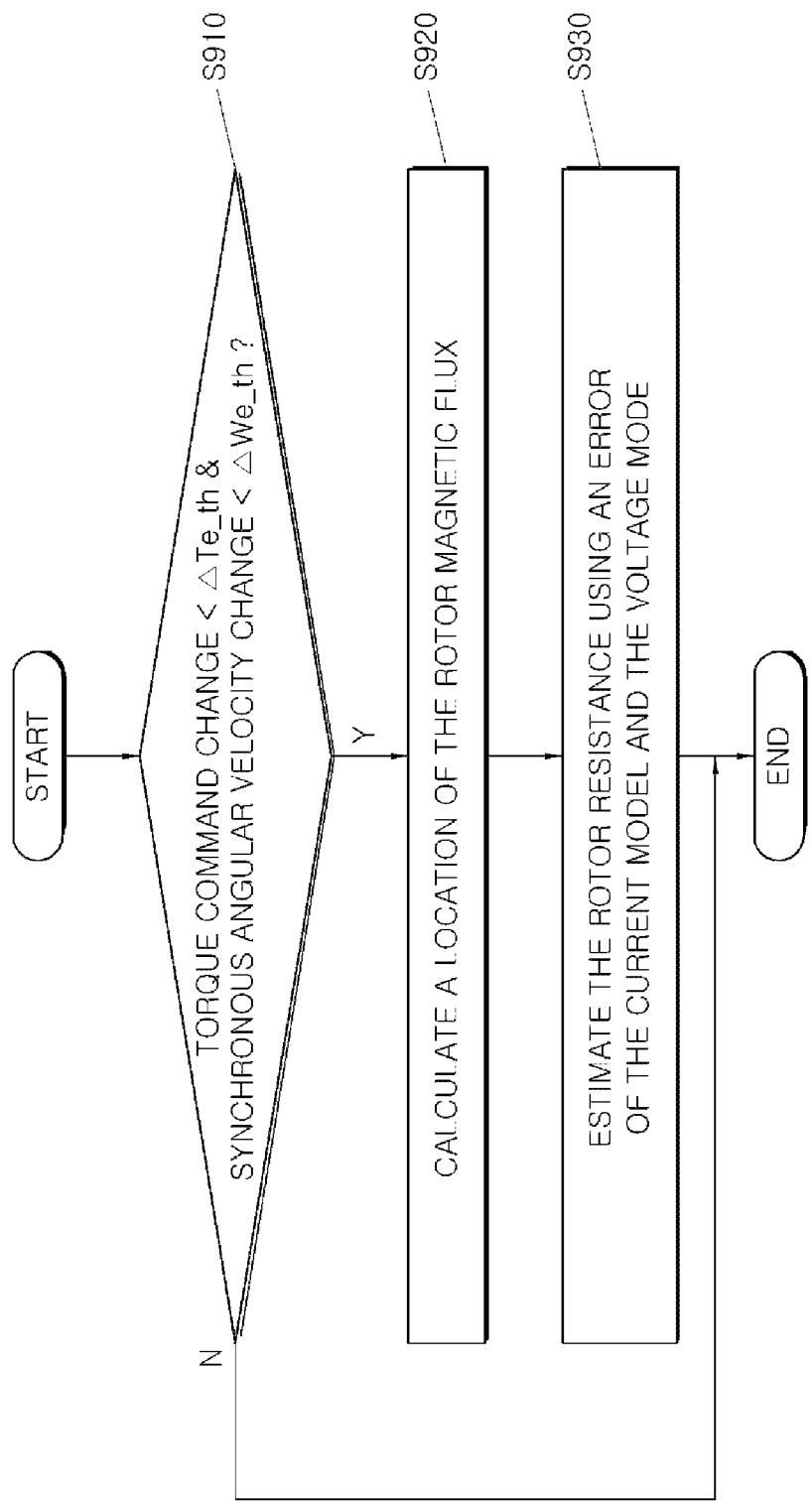
FIG. 9 is a flow chart showing a rotor resistance estimation process according to one embodiment of the present invention.

FIG. 9 is a flow chart showing a rotor resistance estimation process according to one embodiment of the present invention. Referring to FIG. 9, the torque command change value and the synchronous angular velocity change value are compared with the specific value which is predetermined in advance (the step S910).

As the comparison result, in the step S5910, if the torque command change value and the synchronous angular velocity change value are less than the specific limit values ΔTe_th, ΔWe_th, the rotor resistance estimation function is turned on to perform the rotor resistance estimation process. In addition to the above, the location of the rotor magnetic flux is calculated and the rotor resistance is estimated by using the error of the current model and the voltage model (Step 920 and step 930).

In the step S910, unlike the above, as the comparison result, the torque command change value and the synchronous angular velocity change value are greater than the specific limit values ΔTe_th, ΔWe_th, the rotor resistance estimation function is turned off and the rotor resistance estimation is not performed.

According to embodiments of the present invention, the rotor resistance of the induction motor is estimated in real time to maintain the torque control performance even under a circumstance of a change of the rotor temperature so that it is possible to secure a torque control performance which is not sensitive to a change of the rotor temperature.

In addition, embodiments of the present invention is further advantageous in that it is possible to estimate the rotor resistance value (that is, a monitoring of the rotor temperature can be performed) more accurately than the method which uses a coil temperature of the rotor.

In embodiments of the present invention, furthermore, the apparatus and method for controlling the temperature change in the motor can be easily realized as compared with the method utilizing a heat resistance/heat capacity.

While embodiments of the present invention have been described, it will be apparent to those skilled in the art that various changes and modifications may be made without departing from the spirit and scope of the invention as defined in the following claims.

What is claimed is:

1. An apparatus for controlling a temperature change in a motor comprising a rotor, the apparatus comprising:
   a rotor resistance estimator configured to calculate a rotor resistance estimation value of the rotor utilizing a DQ-axis voltage command value and a coordinate conversion DQ-axis current value;
   a synchronous angle estimator configured to estimate a synchronous angle utilizing the rotor resistance estimation value, a rotor angular velocity of the rotor and a DQ-axis current command value;
   a coordinate converter configured to create the coordinate conversion DQ-axis current value utilizing the synchronous angle and a current value sensed as being applied to the motor;
   a current controller configured to create the DQ-axis voltage command value utilizing the DQ-axis current command value and the coordinate conversion DQ-axis current value;
   a power converter configured to convert power according to the DQ-axis voltage command value and to cause the converted power to be supplied to the motor;
   a first rotor magnetic flux estimator configured to calculate a first rotor magnetic flux estimation using a voltage model and without using a rotor resistance value; and
   a second rotor magnetic flux estimator configured to calculate a second rotor magnetic flux estimation using a current model and also using the rotor resistance value
   wherein the rotor resistance estimator is configured to calculate the rotor resistance estimation value utilizing a difference between the first rotor magnetic flux estimation and the second rotor magnetic flux estimation,
   wherein the DO-axis current command value is calculated by using a Q-axis current map and a D-axis current map in which the values corresponding to a torque command value and a synchronous angular velocity value are set, respectively, in advance,
   wherein the rotor resistance estimator is configured to compare a torque command change value and a synchronous angular velocity change value with a predetermined reference value, wherein the rotor resistance estimator is configured to turn-on a rotor resistance estimation function if the torque command change value and the synchronous angular velocity change value are smaller than the predetermined reference value, wherein the rotor resistance estimator is configured to turn-off the rotor resistance estimation function if the torque command change value and the synchronous angular velocity change value are greater than the predetermined reference value.

2. The apparatus of claim 1, wherein the rotor resistance estimator is configured to use the voltage model as a reference model and set the current model as an adaptive model.

3. The apparatus of claim 1, wherein the rotor resistance value changes according to temperature of the rotor and changes more slowly than a magnetic flux and the current value.

4. The apparatus of claim 1, wherein the coordinate converter is configured to use a synchronous frame.

5. The apparatus of claim 1, wherein the synchronous angle estimator is configured to set a proportional integral (PI) control gain using a phase locked loop (PPL) scheme so that each estimation error becomes zero (0).

6. The apparatus of claim 1, wherein the power converter is configured to convert the DQ-axis voltage command value into an input current of the motor using a pulse width modulation (PWM) method.

7. The apparatus of claim 3, wherein the rotor resistance estimation value is calculated using a magnetic flux estimation value of the voltage model and a magnetic flux estimation value of the current model.

8. The apparatus of claim 5, wherein the synchronous angle estimator is configured to calculate a location of a DQ magnetic flux of the rotor using the current model, a magnitude of each estimated error is similar to a ratio of the DQ magnetic flux of the rotor, and the ratio of the DQ magnetic flux of the rotor is maintained at the value which is less than 0.1.

9. The apparatus of claim 7, wherein the magnetic flux estimation value of the voltage model is the value in a normal status and the magnetic flux estimation value of the current model is the value in real time.

10. A method of controlling a temperature change in a motor comprising a rotor, the method comprising:
    calculating a rotor resistance estimation value utilizing a DQ-axis voltage command value and a coordinate conversion DQ-axis current value;
    estimating a synchronous angle utilizing the rotor resistance estimation value, a rotor angular velocity of the motor and a DQ-axis current command value;

creating the coordinate conversion DQ-axis current value utilizing the synchronous angle and a current value sensed as being applied to the motor;

creating the DQ-axis voltage command value utilizing the DQ-axis current command value and the coordinate conversion DQ-axis current value;

converting power according to the DQ-axis voltage command value and supplying the converted power to the motor;

calculating a first rotor magnetic flux estimation using a voltage model and without using a rotor resistance value; and calculating a second rotor magnetic flux estimation using a current model and also using the rotor resistance value, wherein calculating the rotor resistance estimation value utilizes a difference between the first rotor magnetic flux estimation and the second rotor magnetic flux estimation, wherein the DO-axis current command value is calculated using a Q-axis current map and a D-axis current map in which the values corresponding to a torque command value and a synchronous angular velocity value are set, respectively, in advance, wherein calculating the rotor resistance estimation value comprises:

comparing a torque command change value and a synchronous angular velocity change value with a predetermined reference value, turning-on a rotor resistance estimation function if the torque command change value and the synchronous angular velocity change value are smaller than the predetermined reference value, and turning-off the rotor resistance estimation function if the torque command change value and the synchronous angular velocity change value are greater than the predetermined reference value.

11. The method of claim 10, wherein the voltage model is used as a reference model and the current model is set as an adaptive model.

12. The method of claim 11, wherein the rotor resistance value changes according to temperature of the rotor and changes more slowly than the magnetic flux and the current value.

* * * * *